United States Patent [19]

Cullen et al.

[11] Patent Number: 4,957,521
[45] Date of Patent: Sep. 18, 1990

[54] PACKET STRIP

[75] Inventors: John S. Cullen; Edgard Matrak, both of Buffalo, N.Y.

[73] Assignee: Multiform Desiccants, Inc., Buffalo, N.Y.

[21] Appl. No.: 877,310

[22] Filed: Jun. 23, 1986

[51] Int. Cl.⁵ .............................................. B01D 53/04
[52] U.S. Cl. .................................... 55/387; 55/389; 55/515; 210/282
[58] Field of Search .......... 55/316, 387, 389, 512–515; 210/282; 426/126

[56] References Cited

U.S. PATENT DOCUMENTS

| | | | |
|---|---|---|---|
| 2,208,951 | 7/1940 | Tamassy | 426/410 X |
| 2,257,823 | 10/1941 | Stokes | 426/410 X |
| 2,260,064 | 10/1941 | Stokes | 426/410 X |
| 2,377,118 | 5/1945 | Weisman | 426/410 X |
| 2,591,490 | 4/1952 | Allen | 55/515 X |
| 2,789,369 | 4/1957 | Walker | 55/387 X |
| 3,291,377 | 12/1966 | Eggen | 426/126 X |
| 3,727,769 | 4/1973 | Scholl | 55/515 X |
| 3,951,812 | 4/1976 | Hsu | 210/282 |
| 3,990,872 | 11/1976 | Cullen | 55/389 X |
| 4,116,649 | 9/1978 | Cullen et al. | 55/387 |
| 4,124,116 | 11/1978 | McCabe, Jr. | 55/387 X |
| 4,224,366 | 9/1980 | McCabe, Jr. | 55/387 X |
| 4,272,264 | 6/1981 | Cullen et al. | 55/387 |
| 4,401,447 | 8/1983 | Huber | 55/387 |
| 4,405,347 | 9/1983 | Cullen et al. | 55/387 |
| 4,419,236 | 12/1983 | Hsu | 210/282 |
| 4,497,712 | 2/1985 | Cowling | 210/282 X |

*Primary Examiner*—Robert Spitzer
*Attorney, Agent, or Firm*—Joseph P. Gastel

[57] ABSTRACT

A strip of packets containing bulk material which may be powdered, granular, beaded, or the like, the strip being formed from a heat-fusible material, each of the packets including a wall and fused end portions for confining the bulk material, and a fused seam extending longitudinally of the strip of packets and being located in a wall of each packet and extending through the fused end portions of the packets, and perforations extending through the end portions and the portion of the fused seam thereon, with each of the perforations being bounded by a fused section of material which is grommet-like in form.

7 Claims, 1 Drawing Sheet

U.S. Patent  Sep. 18, 1990  4,957,521
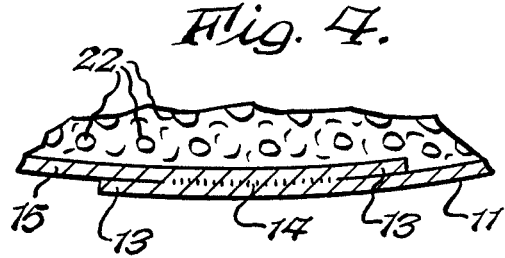
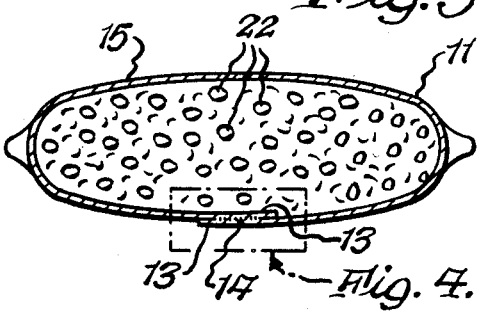
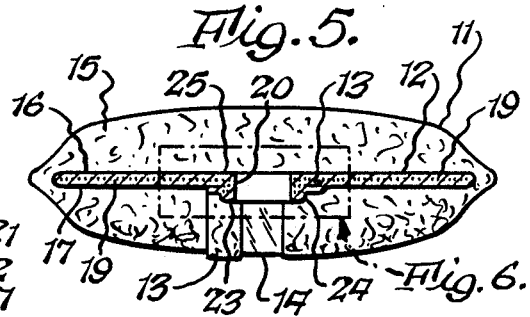
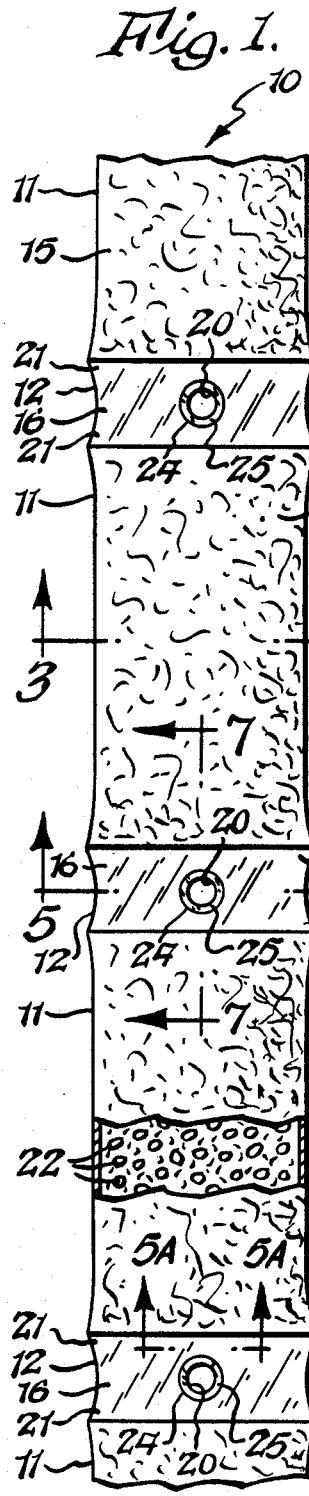
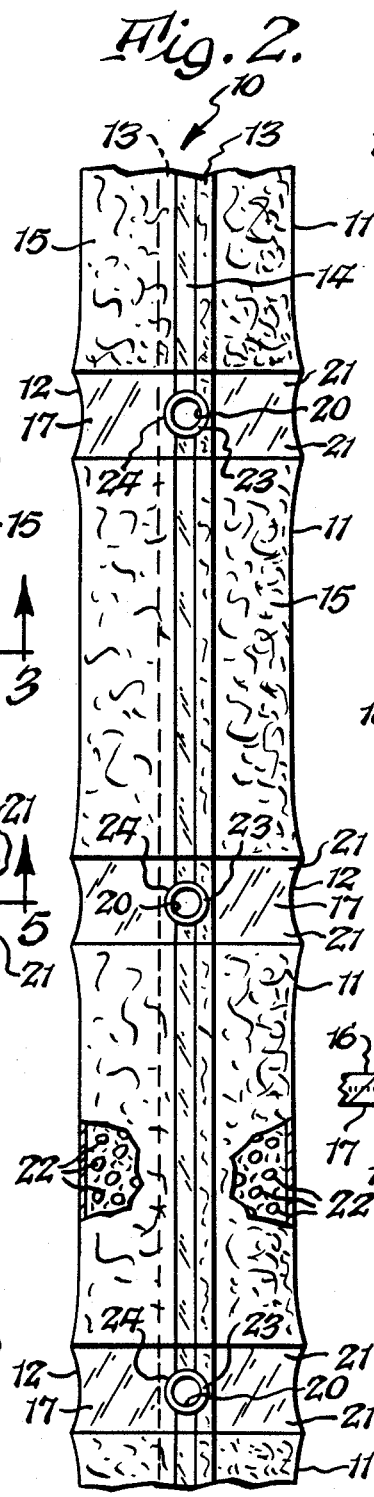
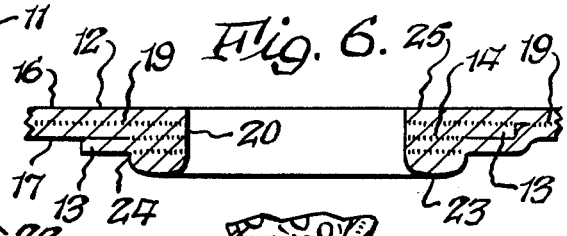
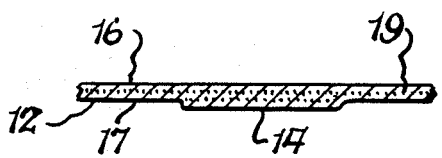
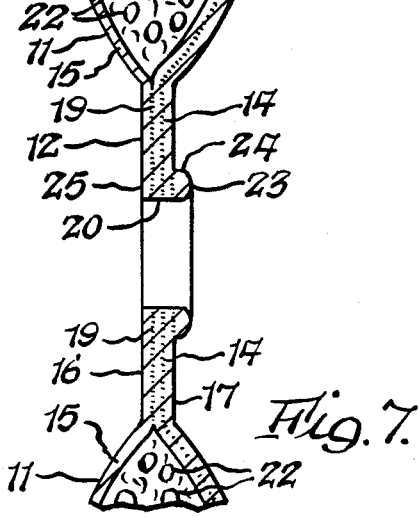

PACKET STRIP

BACKGROUND OF THE INVENTION

The present invention relates to a strip of packets containing bulk material.

By way of background, it is common practice to insert a packet containing a desiccant, adsorbent, or absorbent, into a container which has to be treated thereby. In the past packets of this type were supplied as single units and had to be inserted individually into each container. This was time-consuming and labor-intensive if the packets were being inserted manually. Furthermore, it was difficult to insert them by machine because of the fact that they were pliable, that is, they were not of rigid form.

SUMMARY OF THE INVENTION

It is accordingly one object of the present invention to provide a strip of packets containing bulk material with the strip of packets containing perforations between the packets which can be used to trigger automatic cutting machinery which severs each packet from the strip during a container-filling operation, thereby obviating the above deficiencies of prior methods of inserting packets into containers.

Another object of the present invention is to provide a strip of packets which contain an identifying perforation which also is formed so that it strengthens the section between adjacent packets. Other objects and attendant advantages of the present invention will readily be perceived hereafter.

The present invention relates to a strip of packets containing powdered, granular, or beaded bulk material, or the like, comprising a plurality of packets fabricated from a strip of heat-fusible material and oriented in end-to-end relationship, each of said packets including wall means and a lapped fused seam and fused end portions, said lapped fused seams of said packets being in alignment and extending longitudinally of said strip, sections on said strip between said wall means, said fused end portions of said packets being located in said sections, said fused end portions extending transversely to said lapped fused seams for sealing the ends of said packets, said lapped fused seams being continuous and extending through said fused end portions, said fused end portions of adjacent packets being located in end-to-end relationship, a perforation in each of said sections for providing a line of sight therethrough, and bulk material in each of said packets.

The various aspects of the present invention will be more fully understood when the following portions of the specification are read in conjunction with the accompanying drawings wherein:

BRIEF DESCRIPTION OF THE DRAWINGS

FIG. 1 is a fragmentary top plan view, partially broken away, of the strip of packets;

FIG. 2 is a bottom plan view, partially broken away, of the strip of packets;

FIG. 3 is a cross sectional view taken substantially along line 3—3 of FIG. 1;

FIG. 4 is a fragmentary enlarged view of the section denoted FIG. 4 of FIG. 3;

FIG. 5 is a cross sectional view taken substantially along line 5—5 of FIG. 1;

FIG. 5A is a cross sectional view taken substantially along line 5A—5A of FIG. 1;

FIG. 6 is an enlarged view of the portion of FIG. 5 which is denoted as FIG. 6; and FIG. 7 is a fragmentary cross sectional view taken substantially along line 7—7 of FIG. 1.

DESCRIPTION OF THE PREFERRED EMBODIMENTS

The strip of packets 10 of the present invention includes a plurality of individual packets 11 oriented in end-to-end relationship. Strip 10 is fabricated from an elongated planar strip of heat-fusible material The edges 13 (FIG. 4) of the strip are fused to each other to produce a longitudinal lapped seam 14 which extends longitudinally of strip 10. The seam 14 forms the strip of material into a tube. The heat-fusible material is a spun-bonded polyolefin which is obtainable under the trademark TYVEK, but it may be any other suitable heat-fusible material.

Each packet 11 includes a side wall 15. Sections 12, which are located between adjacent walls 15, comprise fused overlying portions 16 and 17 (FIG. 6) which are sealed to each other completely across the width of the strip at 19. Actually each section 12 is completely sealed except for the perforation 20 therein. The sealing of each section 12 thus provides adjacent sealed end portions 21 for each packet 11 when each packet is severed from the strip. However, before separation the adjacent end portions 21 merge into each other as part of the continuous sealed section 12.

The perforations 20 provide a complete line of sight through sections 12 for the purpose of permitting LED sensors to read a signal at the proper time, while strip 10 is passing through a machine so that a shear mechanism can cut through section 12, preferably along line 5—5 (FIG. 1) so that separate packets 11 can be dropped into containers with which they are to be associated. In this regard, the packets 11 can contain bulk material 22 which may be powdered, granular, beaded, or of any other configuration. The material may also be silica gel, carbon, molecular sieve, or any other type of absorbent, adsorbent, or desiccant.

Each perforation 20 is formed by penetration by a hot wire or probe which also causes an annular grommet-like structure 24 to be formed by fusion of the material surrounding each perforation 20. Grommet 24 extends entirely through seam 14 and also may extend through adjacent end portions 13 of the strip which were not previously fused, that is, grommet 24 may be wider than seam 14, as shown in FIG. 2. The grommet-like structure 24 includes a fused annular portion 25 which is visible when viewed in FIG. 1 and it also includes an annular rim 23 when viewed in FIG. 2. In short, the complete border of perforation 20 comprises a fused annular grommet 24 which completely delineates hole 20 and strengthens each section 12 by the fusion.

The strips 10 can be placed on rolls or can be accordian-pleated in boxes so that they can be readily dispensed to a cutting machine as required during a container filling operation.

While preferred embodiments of the present invention have been disclosed, it will be appreciated that it is not limited thereto but may be otherwise embodied within the scope of the following claims.

What is claimed is:

1. A strip of packets comprising a plurality of packets fabricated from a strip of heat-fusible material and oriented in end-to-end relationship, each of said packets including wall means and a fused seam and fused end portions, said fused seams of said packets being in alignment and extending longitudinally of said strip, sections on said strip between said wall means, said fused end portions of said packets being located in said sections, said fused end portions extending transversely to said fused seams for sealing the ends of said packets, said fused seams being continuous and extending through said fused end portions, said fused end portions of adjacent packets being located in end-to-end relationship, means in each of said sections for providing a line of sight therethrough for permitting a sensor to read a signal, bulk material in each of said packets, said means in each of said sections comprising a perforation, said perforations extending through a portion of said fused seam in each of said sections, and each of said perforations including a fused grommet-like border.

2. A strip of packets as set forth in claim 1 wherein said fused end portions of adjacent packets merge into each other so that said sections between said wall means are completely fused, and wherein said fused grommet-like borders also extends through portions of said completely fused sections.

3. A strip of packets comprising a plurality of packets fabricated from a strip of heat-fusible material and oriented in end-to-end relationship, each of said packets including wall means and a fused seam and fused end portions, said fused seams of said packets being in alignment and extending longitudinally of said strip, sections on said strip between said wall means, said fused end portions of said packets being located in said sections, said fused end portions extending transversely to said fused seams for sealing the ends of said packets, said fused seams being continuous and extending through said fused end portions, said fused end portions of adjacent packets being located in end-to-end relationship, means in each of said sections for providing a line of sight therethrough for permitting a sensor to read a signal, bulk material in each of said packets, said means in each of said sections comprising a perforation, and each of said perforations including a fused grommet-like border.

4. A strip of packets as set forth in claim 3 wherein said fused end portions of adjacent packets merge into each other so that said sections between said wall means are completely fused, and wherein said fused grommet-like borders also extends through portions of said completely fused sections.

5. A strip of packets comprising a plurality of packets fabricated from a strip of heat-fusible material and oriented in end-to-end relationship, each of said packets including wall means and a fused seam and fused end portions, said fused seams of said packets being in alignment and extending longitudinally of said strip, sections on said strip between said wall means, said fused end portions of said packets being located in said sections, said fused end portions extending transversely to said fused seams for sealing the ends of said packets, said fused seams being continuous and extending through said fused end portions, said fused end portions of adjacent packets being located in end-to-end relationship, means in each of said sections for providing a line of sight therethrough for permitting a sensor to read a signal, bulk material in each of said packets, said means in each of said sections comprising a perforation, each of said perforations being of circular shape, and an annular grommet-like border of fused material of said sections constituting a border of each of said perforations of circular shape.

6. A strip of packets as set forth in claim 5 wherein each of said perforations and said grommet-like border extends through said fused seams.

7. A strip of packets comprising a plurality of packets fabricated from a strip of heat-fusible material and oriented in end-to-end relationship, each of said packets including wall means and fused end portions, sections on said strip between said wall means of adjacent packets, said fused end portions of said packets being located in said sections, said fused end portions sealing the ends of said packets, said fused end portions of adjacent packets being located in end-to-end relationship, means in each of said sections for providing a line of sight therethrough for permitting a sensor to read a signal, bulk material in each of said packets, said means in each of said sections comprising a perforation, each of said perforations being of circular shape, and an annular grommet-like border of fused material of said sections constituting a border of each of said perforations of circular shape.

* * * * *